(12) United States Patent
Ito

(10) Patent No.: US 10,494,831 B2
(45) Date of Patent: Dec. 3, 2019

(54) FRAME STRUCTURES

(71) Applicant: Nissin Precision Machines Co., Ltd., Tokyo (JP)

(72) Inventor: Takao Ito, Tokyo (JP)

(73) Assignee: NISSIN PRECISION MACHINES CO., LTD., Tokyo (JP)

( * ) Notice: Subject to any disclaimer, the term of this patent is extended or adjusted under 35 U.S.C. 154(b) by 0 days.

(21) Appl. No.: 16/123,638

(22) Filed: Sep. 6, 2018

(65) Prior Publication Data

US 2019/0136572 A1     May 9, 2019

(30) Foreign Application Priority Data

Nov. 6, 2017    (JP) ................................ 2017-213808

(51) Int. Cl.
*E04B 1/18*      (2006.01)
*E04B 2/00*      (2006.01)
(Continued)

(52) U.S. Cl.
CPC .............. *E04H 15/34* (2013.01); *E04B 1/18* (2013.01); *E04C 2/30* (2013.01); *E04C 2/44* (2013.01); *E04H 15/36* (2013.01); *E04B 1/3211* (2013.01); *E04B 1/3441* (2013.01); *E04B 7/105* (2013.01); *E04B 2001/3247* (2013.01)

(58) Field of Classification Search
CPC ....... E04H 15/38; E04H 15/34; E04B 1/1909; E04B 1/19; E04B 2001/1927; E04B 2001/1978; E04B 2001/1924; E04B 2001/3235; E04B 2001/3205; E04B 2001/3211; E04C 2/421; E04C 2/422; E04C 2/428; E04C 2/44; E04C 2/40; E04C 2/30
See application file for complete search history.

(56) References Cited

U.S. PATENT DOCUMENTS

| | | | | |
|---|---|---|---|---|
| 946,093 | A | * | 1/1910 | Altmyer .................... E04B 1/19    52/651.09 |
| 1,982,110 | A | * | 11/1934 | Keown .................... E04C 2/365    404/40 |

(Continued)

FOREIGN PATENT DOCUMENTS

| | | | | |
|---|---|---|---|---|
| GB | 897899 | A | * 5/1962 | ........... E04B 1/1903 |
| JP | 51-88046 | | 7/1976 | |

(Continued)

OTHER PUBLICATIONS

JPO, Office Action in corresponding JP Application 2017-213808, dated Sep. 18, 2018.

(Continued)

*Primary Examiner* — Christine T Cajilig
(74) *Attorney, Agent, or Firm* — Ryan Alley IP

(57) ABSTRACT

A frame structure using a tube subjected to bending processing by a pushing bending apparatus is provided to solve the problem of a simple body constituting the small-sized interior space. The frame structure forms a plane of frames by bundling a plurality of tubes or bars, each of which is bent to form a waveform of a constant amplitude around a linear axis in a same plane, to contact maximum amplitude portions of the tubes or bars each other, each maximum amplitude portion being in the same position in the longitudinal direction.

6 Claims, 15 Drawing Sheets

(51) Int. Cl.
*E04C 2/30* (2006.01)
*E04B 1/32* (2006.01)
*E04B 1/344* (2006.01)
*E04H 15/34* (2006.01)
*E04H 15/36* (2006.01)
*E04B 7/10* (2006.01)

(56) References Cited

U.S. PATENT DOCUMENTS 4,259,385 A * 3/1981 Keller .................. B21D 31/043
 428/135
4,876,134 A * 10/1989 Saitoh .................. B32B 3/12
 428/73
6,343,452 B1 * 2/2002 Holden .................. B64C 1/08
 52/653.2

FOREIGN PATENT DOCUMENTS

| JP | 51-102077 | | 9/1976 | |
|----|-----------|---|--------|---|
| JP | 5-78896 | | 10/1993 | |
| JP | 2008008134 | * | 1/2008 | ............. B21D 31/04 |
| WO | WO-2007139143 A1 | * | 12/2007 | ............. B21D 31/04 |

OTHER PUBLICATIONS

JPO, Office Action in corresponding JP Application 2017-213808, dated Apr. 9, 2019.
JPO, Office Action in corresponding JP Application 2017-213808, dated Jul. 24, 2019.

* cited by examiner

FRAME STRUCTURES

FIELD

The present invention relates to frame structures, utilized in garage, agricultural greenhouses, tent house and other simple building body, and further relates to configuration of bundling a tube or bars subjected to bending processing.

BACKGROUND

Conventionally, as frame structures to be applied to the building body for forming a large indoor space such as large tents and tents warehouses, the morphological stability, high rigidity and strength are required. Thus, truss structures are mainly used.

On the other hand, with respect to a simple frame for constructing a relatively small indoor space such as a domestic garage or an agricultural vinyl house, the roof is low in its own weight and relatively low in height. Therefore, it is possible to employ Rigit Frame (Rahmen Structure) to both side wall portions, while using the frame structure of the truss structure to the roof portion. According to another frame, a large number of tubes bent into an arch shape or an inverted U shape are supported by the legs in a standing manner. Meanwhile, a horizontal bar crossed at an intermediate position of each tube constitutes a rigid structure.

According to simple frame for constituting the small interior space of the prior art, both side wall portions are erected by rigid frame structure. Accordingly, it is weak against an external force such as wind pressure, and inferior in vibration resistance. It is necessary to apply reinforcement measures as necessary. Also, as the distance between the frame members and the bending tubes arranged at regular intervals increases, the curtain that is stretched or the thin plate material that is attached tends to be deflected. Therefore, when its deflection increases due to secular change, it is unsightly appearance.

Meanwhile, the applicant has developed and improved for the push-through bending method and the processing unit of the tube or bar since 1989. Currently, bending machining against tube material is possible stably and in high-precision with small radius of curvature while preventing a tube section from being flattened. Further, it is possible to realize the bending continuous further freely three-dimensionally.

Therefore, it is an object of the present invention to provide a frame structure using a tube subjected to bending processing by the above pushing bending apparatus, thereby solving the problem of a simple body constituting the small-sized interior space.

With respect to bars, the processing efficiency and the processing accuracy cannot be obtained compared to the tubes even by using the pushing bending apparatus. Thus, the conventional press bending processing is used. However, since it can be used for the frame structure described below, it does not exclude bars.

SUMMARY OF THE INVENTION

An aspect of the present invention is a frame structure that forms a plane of frames by bundling a plurality of tubes or bars, each of which is bent to form a waveform of a constant amplitude around a linear axis in a same plane, to contact maximum amplitude portions of the tubes or bars each other, each maximum amplitude portion being in the same position in the longitudinal direction.

DETAILED DESCRIPTION

With reference to the drawings, the embodiments of the above frame structures will be described. A frame structure using a tube which is mainly subjected to bending by a push through bending method will be described. The typical materials are a carbon steel tube for mechanical structure (STKM) and a stainless steel pipe (such as SUS 304). If mechanical strength is not necessarily required, an aluminum tube is also used.

Incidentally, in the case of the frame structure using the bar, press bending (bending press system), draw bending (rotating draw bending method) and compression bending (compression bending method) are applied as conventionally used for the bending bar. The tube is referred to as a hollow elongated member, is a concept including the pipe and is not distinguished. In this embodiment, it is described as tube and tubular, but it is a concept including pipe.

Figure 1A:
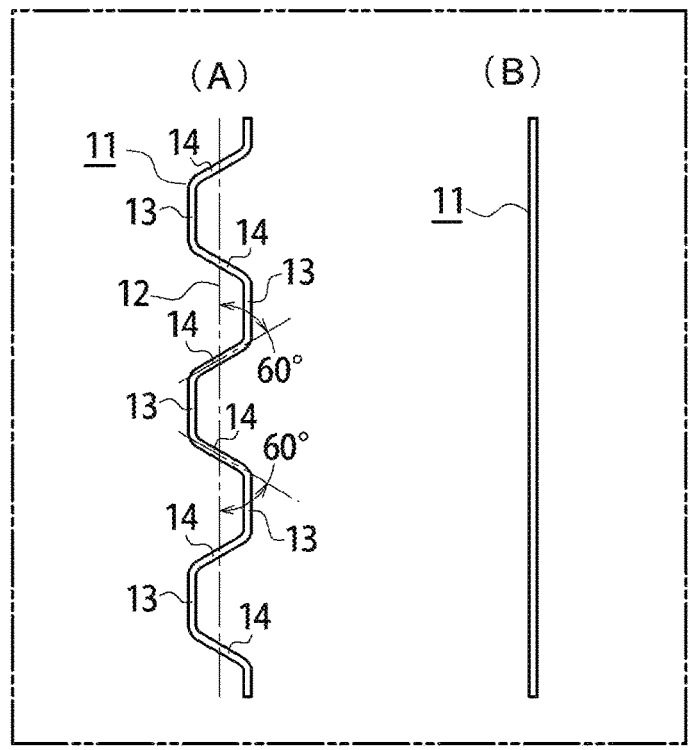
FIG. 1A is a front view of the tube after bending used for frame structures (A) and side view (B).

Examples of a tube 11 used in the frame structure are shown in FIG. 1A of a front view (A) and a side view (B). As shown in the figure, it is bent into a flat waveform.

Specifically, the tube 11 is subjected to bending processing to form a trapezoidal waveform, which includes the maximum amplitude section 13 parallel to the linear axis 12 and an inclined section 14 having a crossing angle of +/−60 degrees with respect to the linear axis 12 to continuously alternate in a same length.

Figure 2:
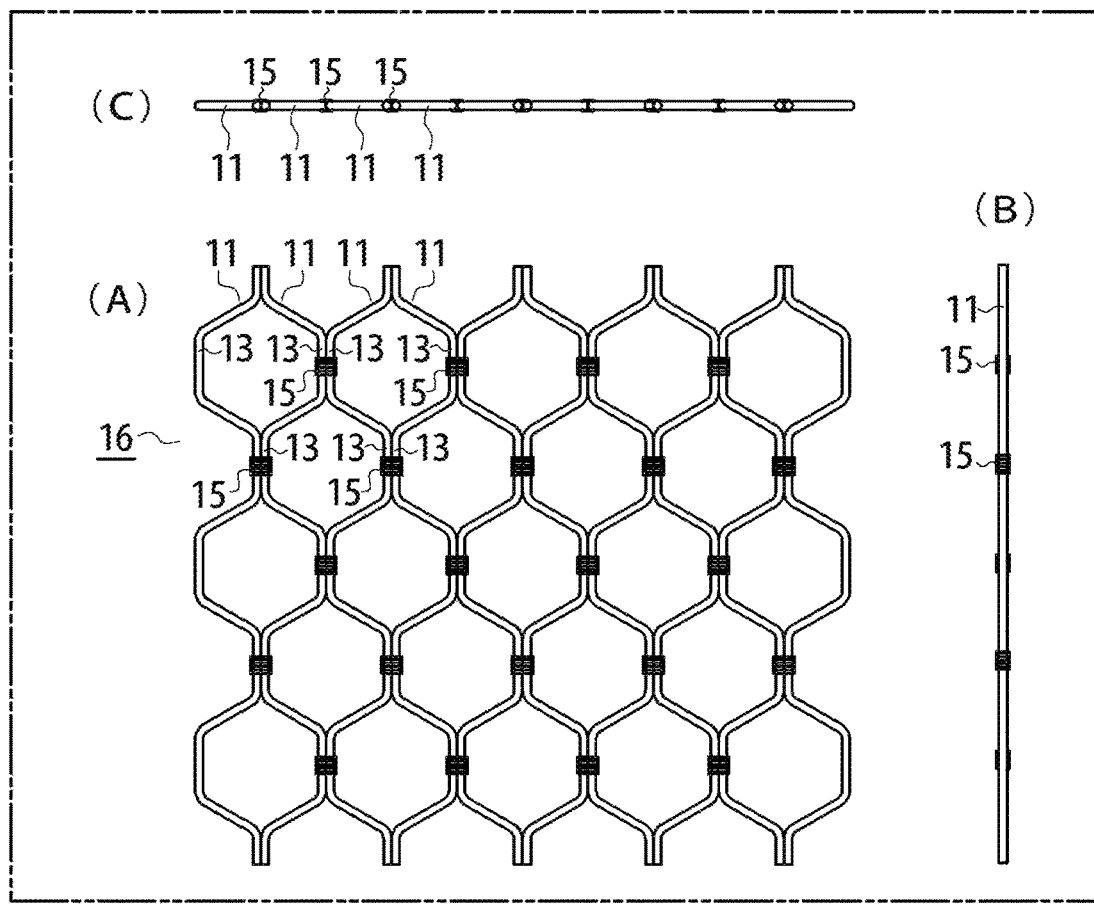
FIG. 2 is a front view (A), a side view (B) and a plan view (C) of the frame structure.

When the tube 11 is reversed, the tube shown in the side view FIG. 1A (B) is symmetrical with respect to the linear axis 12 shown in the front view FIG. 1A (A). A large number of tubes 11 of the same form are prepared, and the maximum amplitude sections 13 are brought into opposing contact with each other. When the bundles are sequentially bundled laterally by the binders 15, the frame structure 16 shown in FIG. 2 is obtained. It should be noted that the frame structure body 16 in this embodiment is formed by bundling ten tubes 11.

Figure 3:
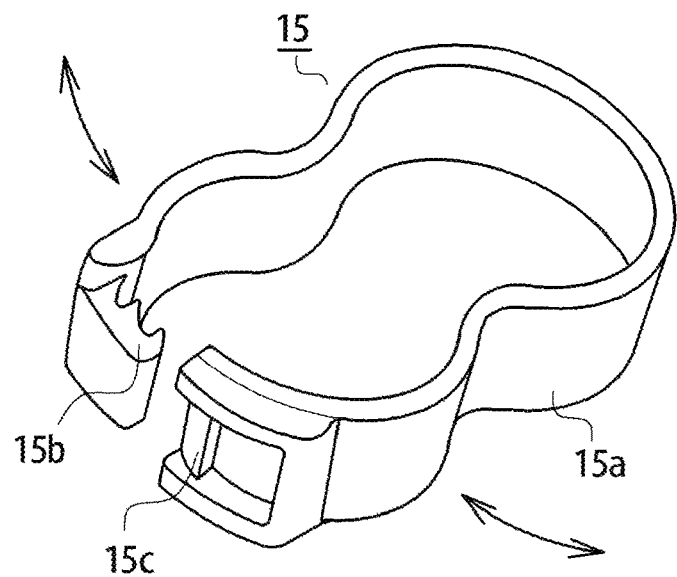
FIG. 3 is an external perspective view showing an example of a binding tool.

The binder 15 is shown in FIG. 3. According to the binder 15, the two tubes 11 are in contact with each other in a parallel relationship. By fixing the metallic hook portion 15b and the engaging portion 15c to both ends of the metal band plate 15a, the binder 15 is formed. Fixation is done by welding. The metal band plate 15a is made of stainless steel which is bent in a form to embrace the outer peripheral surface. According to the binder 15, the elasticity of the band plate 15a is utilized to receive the two tubes 11 inwardly, and the hook portion 15b is hooked on the engagement portion 15c. Thereby, each tube 11 is held and bound.

According to the frame structure body 16 of this embodiment, as shown in FIG. 2, a honeycomb structure in which regular hexagons are arranged without gaps is constituted although it is a planar structure constituted by the tube 11. Furthermore, there is a large strength against external force acting on the frame wall plane direction.

Figure 4:
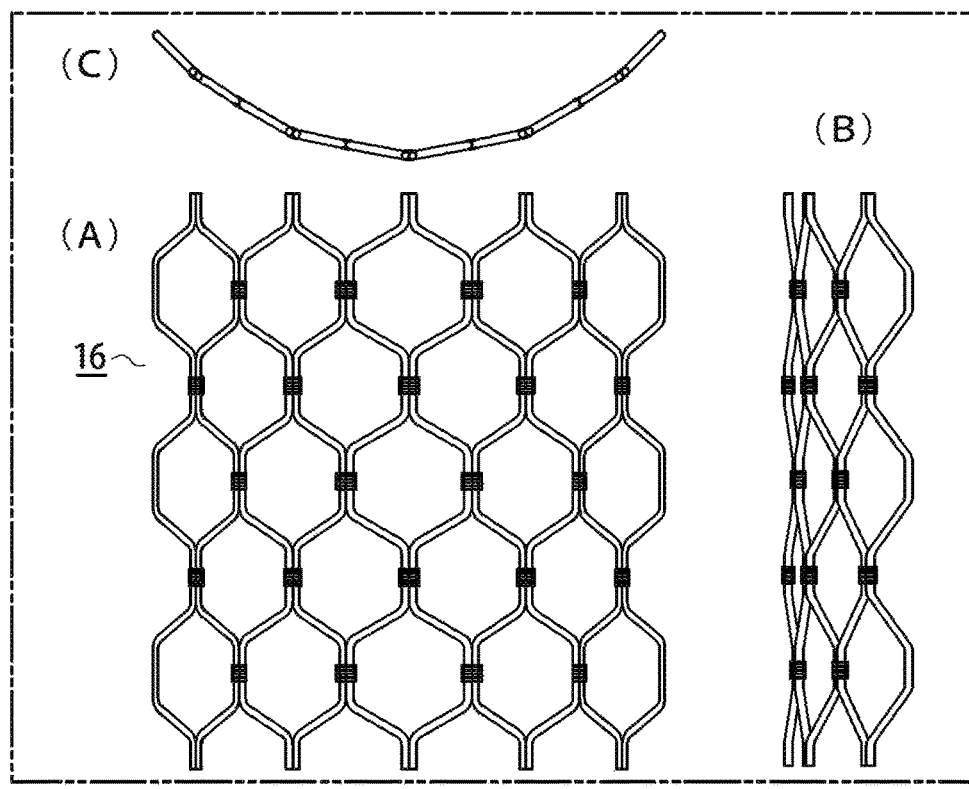
FIG. 4 includes a front view (A), a side view (B) and a plan view (C) showing that the cylindrical plane of the frame wall can be configured in frame structures.

Also, tubes 11 adjacent to each other in the frame structure 16 are freely mutually pivoted simply because the maximum amplitude sections 13 are bundled to each other by the binder 15. Therefore, as shown in FIG. 4, it is possible to bend it to the frame wall constituting a part of the cylindrical plane. Further, it can be a meandering wall plane or a wall plane bent into a triangular wave shape.

Accordingly, the frame structure 16 of this embodiment is mechanically strong even if a thin object is used as a tube 11. Also, a variety of curved planes can be configured with respect to unity connection directions of each tube 11. It is optimum as a unit wall plane for constructing a small-scale curtain installation cladding frame (garage, agricultural vinyl house, etc.) and the like.

In particular, the tube 11 is bent and has the same shape. It is possible to assemble easily by manufacturing many tubes 11. Furthermore, the wall structure can have a uniform ends of each tube 11 as shown in FIGS. 2 and 4. Therefore, as will be described later, the wall plane can be expanded vertically and horizontally by connecting in the longitudinal direction using a tubular joint and connecting in the lateral direction using the binder.

Figure 1B:
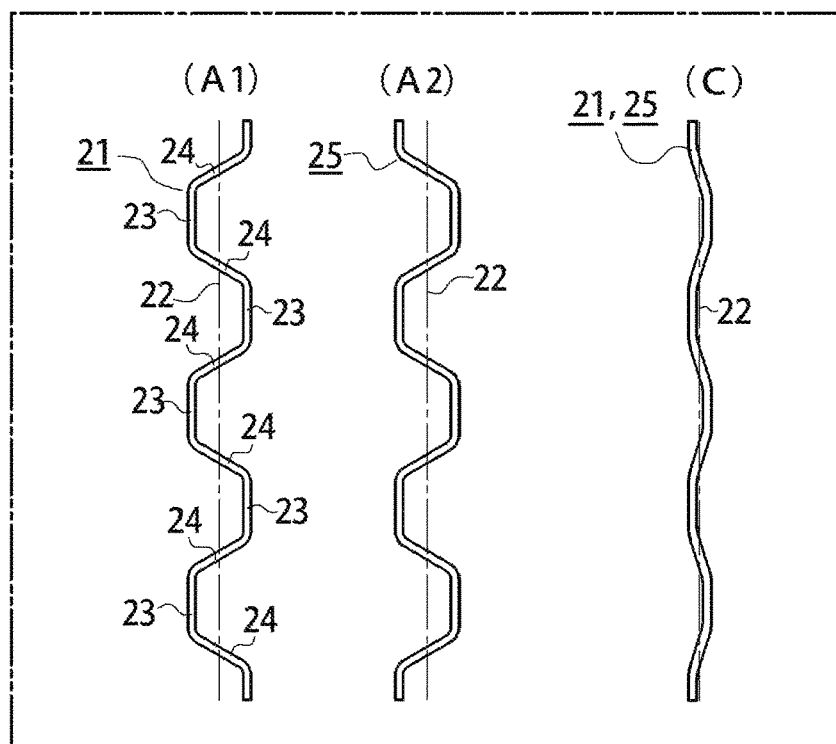
FIG. 1B is a front view of the two tube after bending used for frame structures (A1), a (A2) and a side view (C).

Tubes used for frame structures may be of two types in morphology. One of the tube 21 is shown in FIG. 1B, the front view (A1) and the side view (C). The other tube 25 is shown in FIG. 1B, the front view (A2) and the side view (C).

In the front view, the tube 21 forms, like FIG. 1 (A), a trapezoidal waveform, which includes the maximum amplitude section 23 parallel to the linear axis 22 and an inclined section 24 having a crossing angle of +/−60 degrees with respect to the linear axis 22 to continuously alternate in a same length. The tube 25 has a trapezoidal waveform symmetrical with respect to the tube 21 and the linear axis 22.

However, two types of tube 21 and the tube 25 are used as shown in the side view, FIG. 1B (C). Both tubes 21 and 25 are bent into a trapezoidal waveform around the linear axis 22. The bending processing is given to the trapezoidal waveform, as well as to a direction perpendicular to the direction of bending machining processing.

The trapezoidal waveform of the side view 1B (C) is the same period. The same phase as the trapezoidal waveform of a front view (A1), (A2) of FIG. 1B, and the amplitude is slightly smaller.

Figure 5:
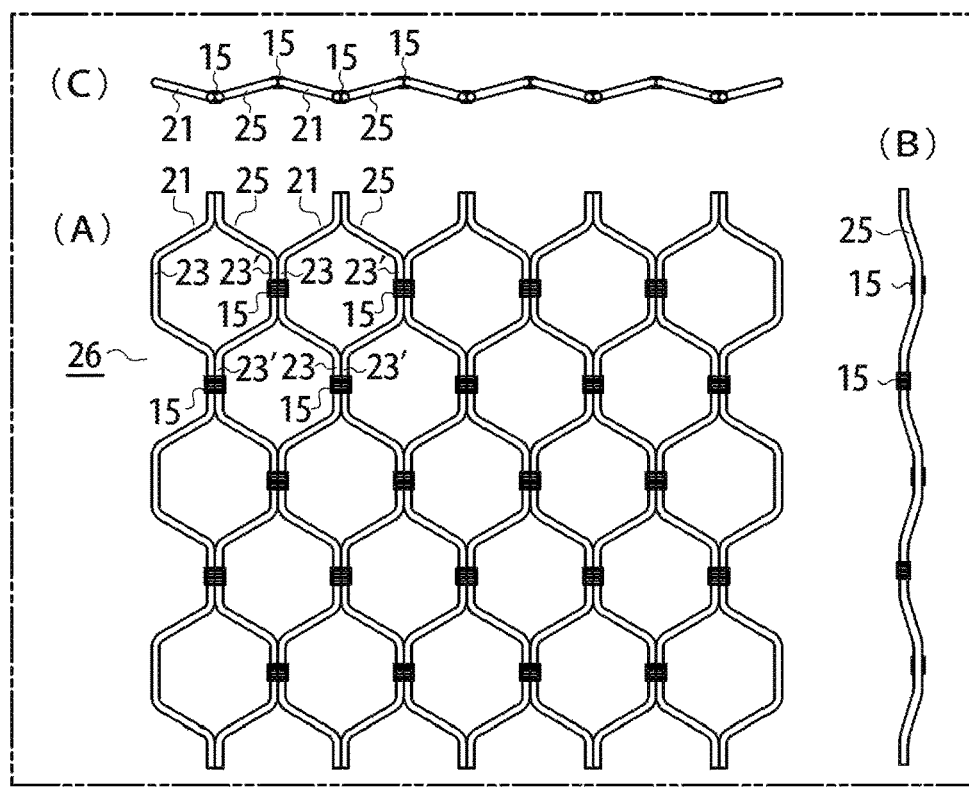
FIG. 5 is a front view (A), a side view (B), and a plan view (C) of one form of a frame structure.

A plurality of tubes 21 and tubes 25 are prepared, and the maximum amplitude section 23 of the tube 21 and the maximum amplitude section 23' of the tube 25 are brought into opposition to each other and are bound by the binder 15. Thereby, a wavy frame structure 26 as shown in FIG. 5 can be constituted. On the corrugated frame wall plane, the bundled portion is the crest (the forefront) and the valley (the rearmost) of the wavefront.

By waving the plane of the frame structure 26, the elastic that pair is assigned to the external force applied in the direction of the tube 21, 25. In addition, when used as a curtain tensioning frame, unique aesthetics due to wavy changes in the frame itself and the stretched curtain of frame appears.

Figure 6A:
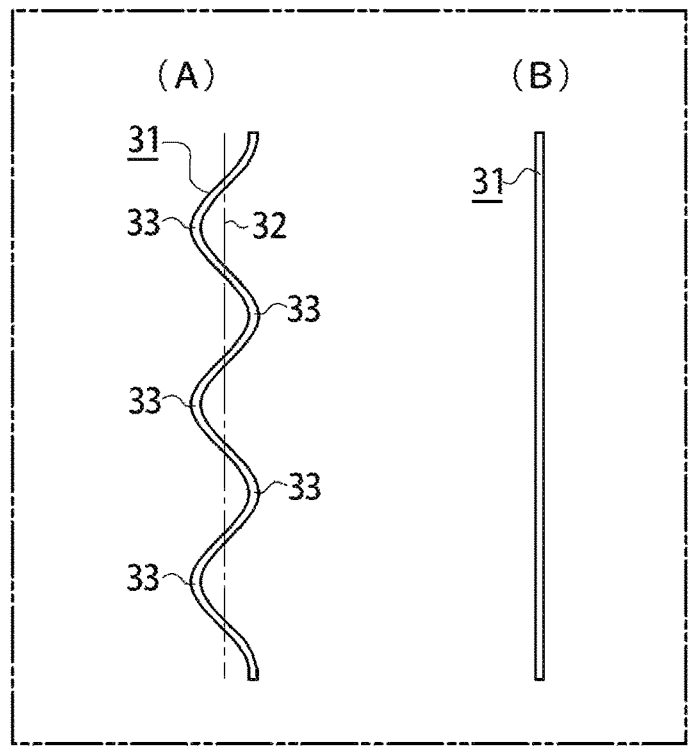
FIG. 6A is a front tube view after bending used in a form of frame structure (A) and side view (B).

Examples of a tube 31 used in the frame structure are shown in FIG. 6A of a front view (A) and a side view (B). As shown in the figure, it is bent into a flat waveform. Specifically, while the tube 11 of FIG. 1 is subjected to bending processing to form a trapezoidal waveform, the tube 31 of FIG. 6 is subjected to bending processing to form sinusoid with a focus axis linear axis 32.

When the tube 31 is reversed, the tube shown in the side view FIG. 6A (B) is symmetrical with respect to the linear axis 32 shown in the front view FIG. 6A (A).

A large number of tubes 31 of the same form are prepared, and the maximum amplitude sections 33 are brought into opposing contact with each other. When the bundles are sequentially bundled laterally by the binders 15, the frame structure 34 shown in FIG. 7 is obtained.

As the binding unit, metal or plastic cable binding band 35 is used since a binding condition is not between the straight section as in FIGS. 1-6 due to the tube 31 bent sinusoidal.

Figure 7:
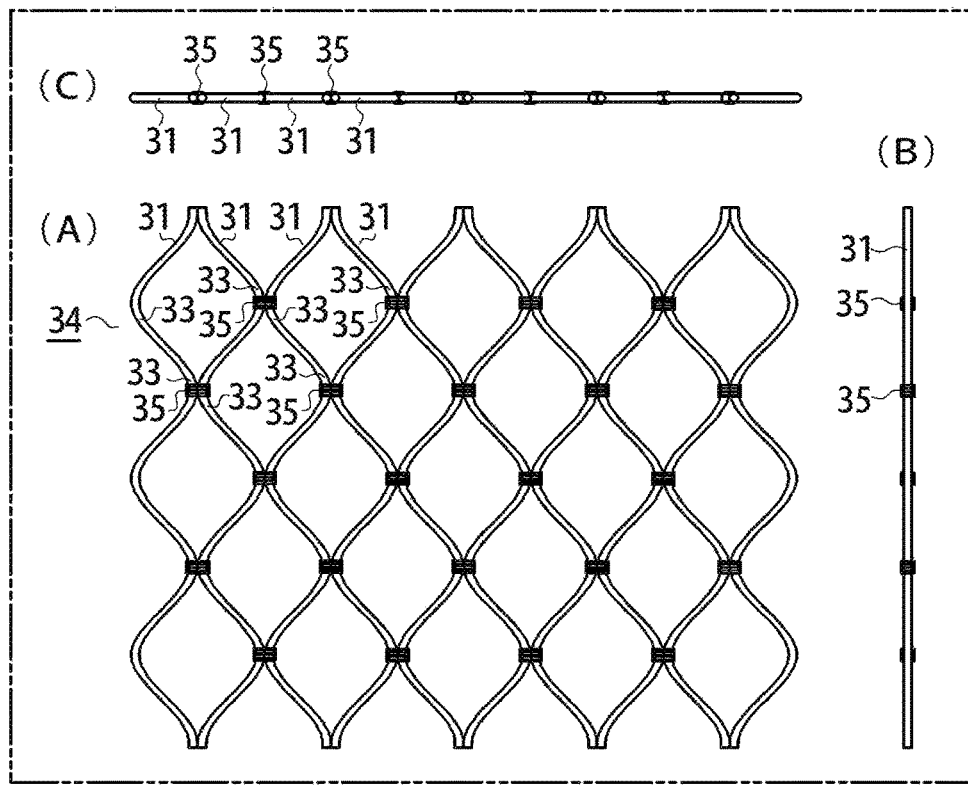
FIG. 7 is a front view (A), a side view (B) and a plan view (C) of one form of a frame structure.

According to frame structure 34, as shown in FIG. 7 (A), by joining the sinusoidal shape of the tubular material 31 to the side, a spindle-like shape forms a continuous framework without a gap in a planar manner. Thereby, a frame surface exhibiting aesthetic appearance with a smooth impression can be constructed.

In this embodiment, the bending processing conditions for the tube are merely different between the trapezoidal waveform and the sinusoidal waveform. The other features are the same.

Figure 6B:
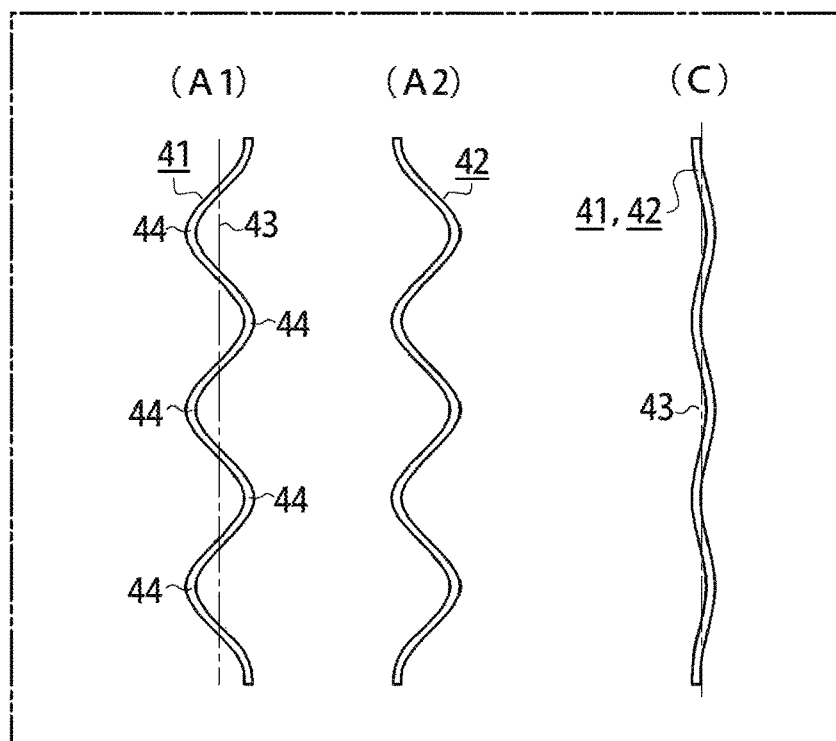
FIG. 6B indicates a front view (A1), a (A2) and a side view (C) of two kinds of the tubes after bending constitutes one form of the frame structures.

Tubes used for frame structures may be of two types in morphology. One of the tube 41 is shown in FIG. 6B, the front view (A1) and the side view (C). The other tube 42 is shown in FIG. 6B, the front view (A2) and the side view (C).

In front view, the tube 41, similar to (A) in FIG. 6 A, sinusoidal bending processing is given with a focus axis linear axis 43. The tube 42 is bent in a sine wave appearing symmetrically with respect to the tube 41 and the linear shaft 43.

In the form shown in FIG. 6B (C), there are two types of tubes 41 and 42. Both of the tubes 41 and 42 are subjected to a bending process to the sinusoidal waveform and a sinusoidal bending process is also performed in a direction perpendicular to the bending process direction.

Note that the sinusoidal waveform of FIG. 6B (C) is the same period and the same phase as the sinusoidal waveform of (A1), (A2) in the same figure, and the amplitude is slightly smaller.

Figure 8:
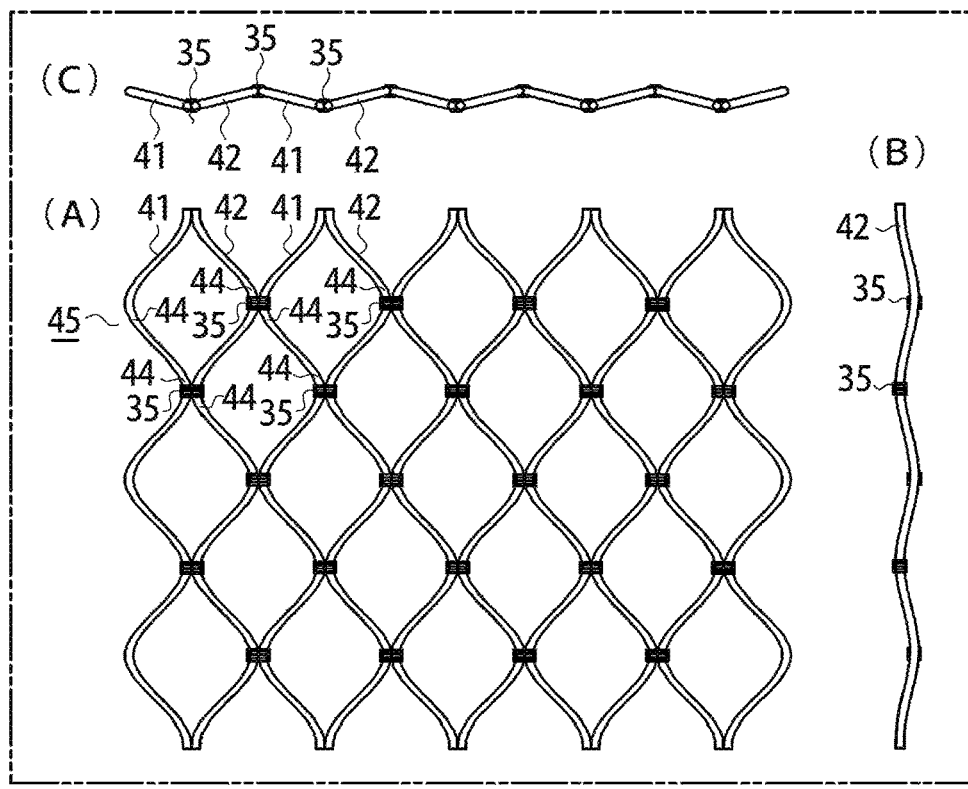
FIG. 8 is a front view (A), a side view (B) and a plan view (C) of one form of a frame structure.

Therefore, a large number of tubes 41 and tubes 42 are prepared. The maximum amplitude portions 44 are brought into opposing contact with each other. Then, when bound by the binding band 35, the framework structure 45 as shown in FIG. 8 can be constructed.

The frame surface of the frame structure 45 has a aesthetics itself. An elasticity against an external force and an aesthetics appear due to the wavy frame surface.

Figure 9:
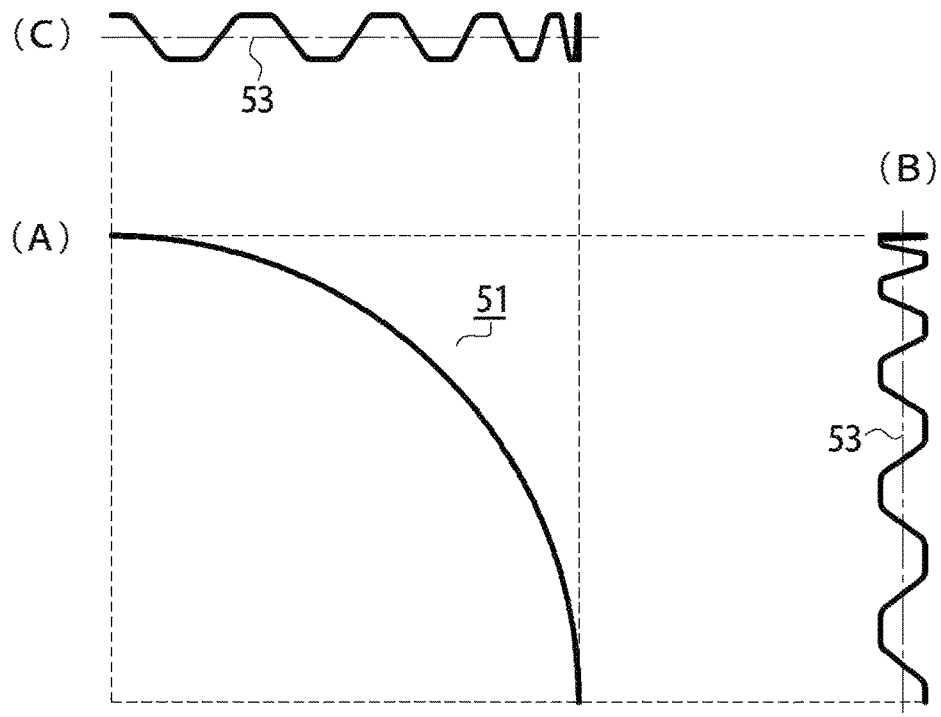
FIG. 9 is a front view (A), a side view (B), and a plan view (C) of one of the tubes after bending used for one form of the frame structure.
Figure 10:
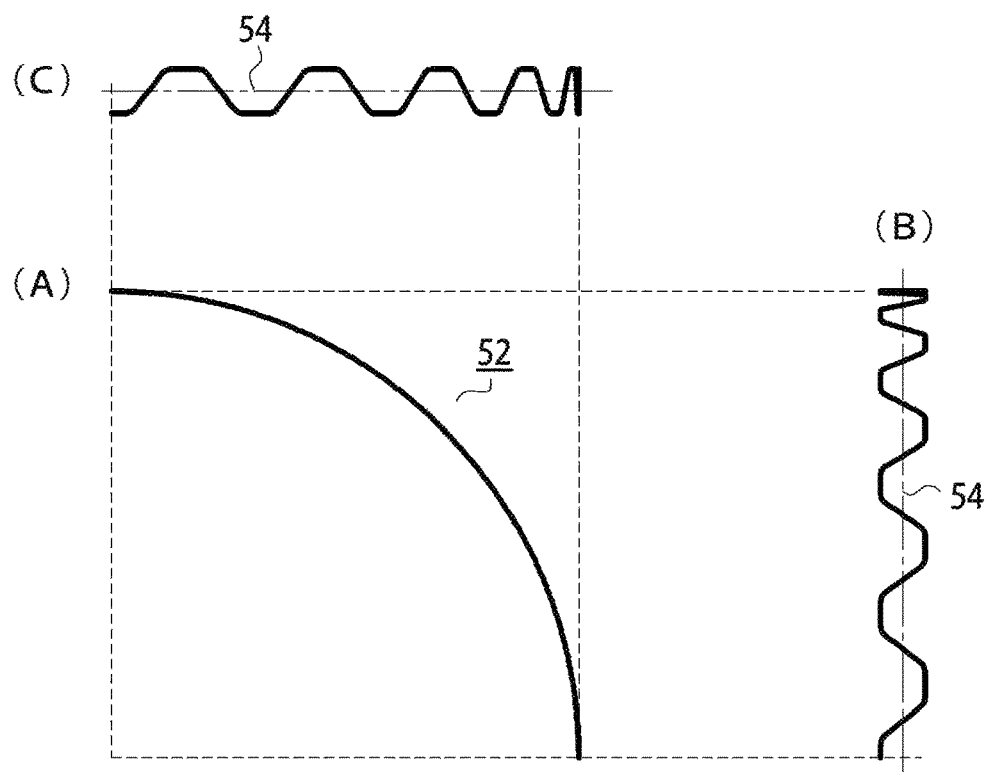
FIG. 10 is a front view of the other tube after bending used in a form of frame structure (A) and side view (B) and plan view (C).

Tubes used for frame structures may be of two types in morphology. One of the tube 51 is shown in FIG. 9, the front view (A), the side view (B) and the plan view (C). The other tube 52 is shown in FIG. 10, the front view (A), the side view (B) and the plan view (C). However, in this embodiment, for the sake of convenience, each tube 51, 52 is depicted by a bold line in the drawing.

As is apparent from the drawings, each of the tubes 51, 52 is bent into a trapezoidal waveform having a constant amplitude around the linear axes 53, 54. It is bent into an arc shape to the bending direction perpendicular to the direction of the trapezoidal waveform at its entire length.

The trapezoidal waveform is the same as the trapezoidal waveform applied to the tube 11. The maximum amplitude section and the slope section are alternately continued with the same length. The maximum amplitude section is parallel to the linear axes 53 and 54, and the inclined section has an intersection angle of +/−60 degrees with respect to the linear axes 53 and 54. The trapezoidal waveforms of the tube 51 and the tube 52 are mutually targeted with respect to the respective linear axes 53 and 54. For arc-shaped bending, it is assumed to be a quarter arc bend, but for both ends, it is assumed to be a straight tubular section for joint connection.

Figure 11:
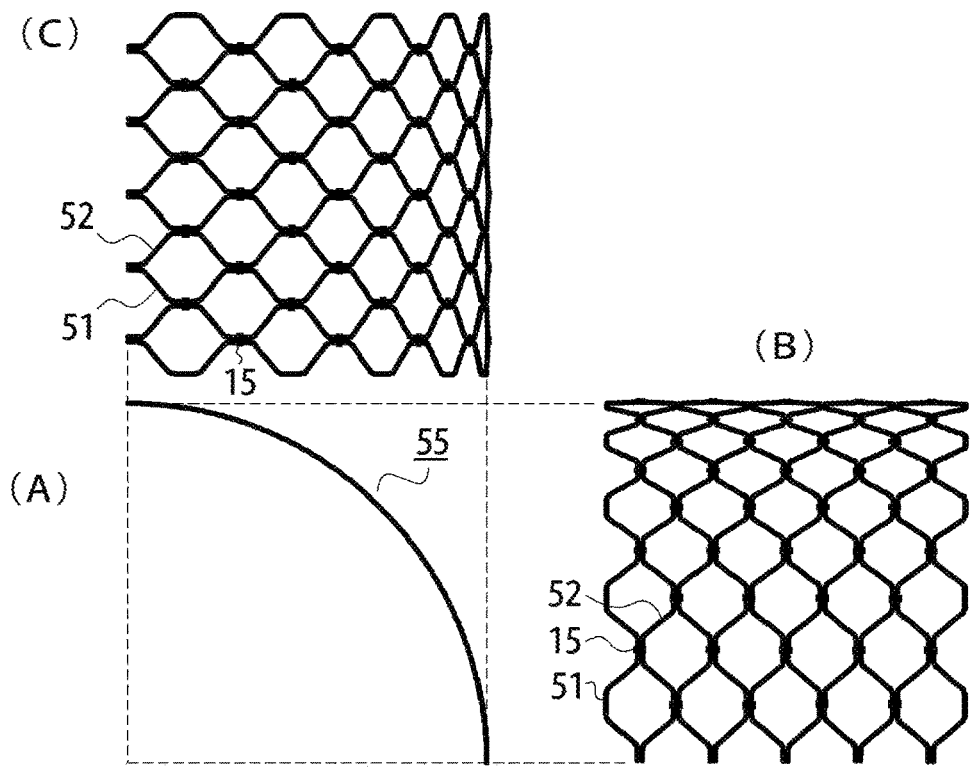
FIG. 11 is a front view (A), a side view (B) and a plan view (C) of another frame structure.

Therefore, using many tubes 51 and tubes 52, each portion at the maximum amplitude of trapezoidal waveform 52 is opposed and abutted for binding by the binder 15. As a result, a frame structure 55 as shown in FIG. 11 can be constructed.

This frame structure 55 constitutes an arcuate frame wall plane of a quarter circular arc, but the tubes 51, 52 are bent into a trapezoidal waveform. Therefore, the frame structure 55 forms a frame wall plane by honeycomb structures as FIGS. 1-6.

Since this frame structure 55 which is an arch shaped frame wall plane based on the honeycomb structure is optimal for a roof part such as a body for stretching the curtain. Therefore, it becomes possible to construct an interior space of a larger area with a simple frame structure. It should be noted that although the case of applying the trapezoidal waveform bending process to each of the tubes 51 and 52 has been described, it may be a bending process to form another waveform such as a sinusoidal waveform or the like.

Figure 12:
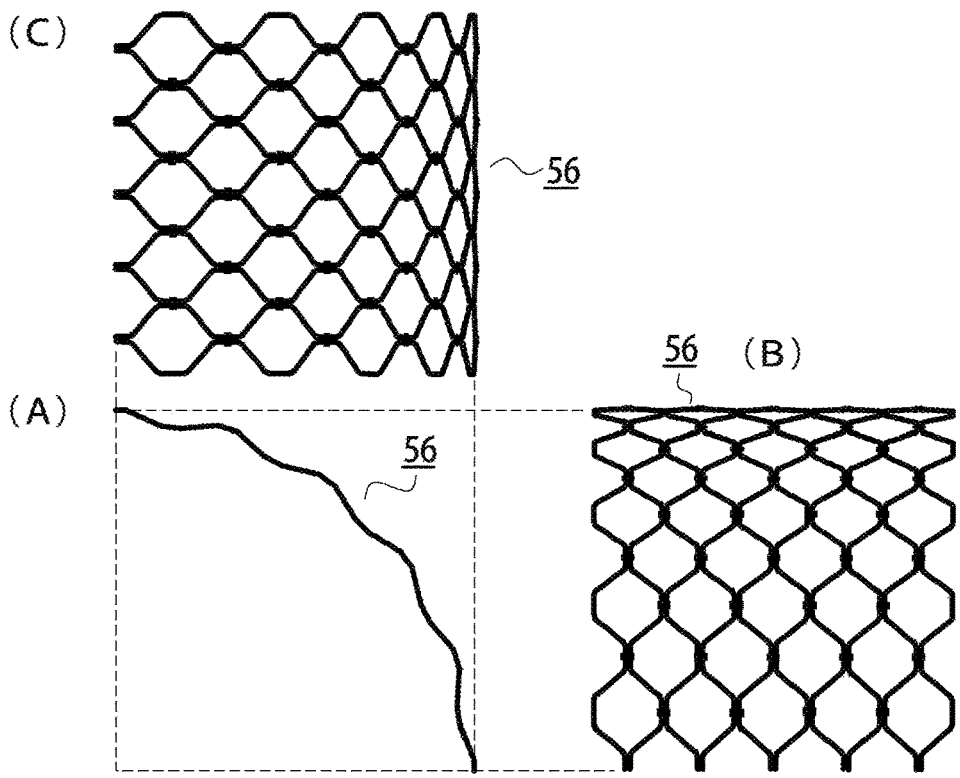
FIG. 12 indicates a front view (A), a side view (B) and a plan view (C) of another frame structure (waving frame wall).

Further, the tube 51 and the tube 52 may be subjected to a bending process while being superimposed on the trapezoidal waveform bending and the arcuate bending. In this bending process, a trapezoidal waveform or a sinusoidal waveform having a constant amplitude and a constant period is formed around an arc bent plane. In this case, a wavy arcuate frame wall is formed as shown in frame structure 56 of FIG. 12, as well as imparting a certain elasticity to the frame face to express specific aesthetics.

Next, a mechanism for connecting the frame structure body at the end portions of the respective tubes will be described. As a condition for the connection, both end faces of each tube in the frame structure should be aligned in two planes perpendicular to the linear axis which is the center of the amplitude of the trapezoidal waveform or the sinusoidal waveform. Another condition is that the positions of the end faces of the tubes are identical. As clearly seen from FIGS. 2, 5, 7, 8, 11 and FIG. 12, all the prerequisites of conditions for the connection are satisfied regarding frame structures 16, 26, 34, 45, 55, and 56.

Therefore, here will be described a case of connecting the frame structures 16 as an example, while the above conditions are applied to frame structures 26,34,45, 55, 56 as well.

First, as shown in (C) of FIG. 2, at both ends of each tube 11 in frame structures 16, end planes of the two tubes 11 are aligned in a row as an adjacent pair to be equally spaced.

Figure 13:
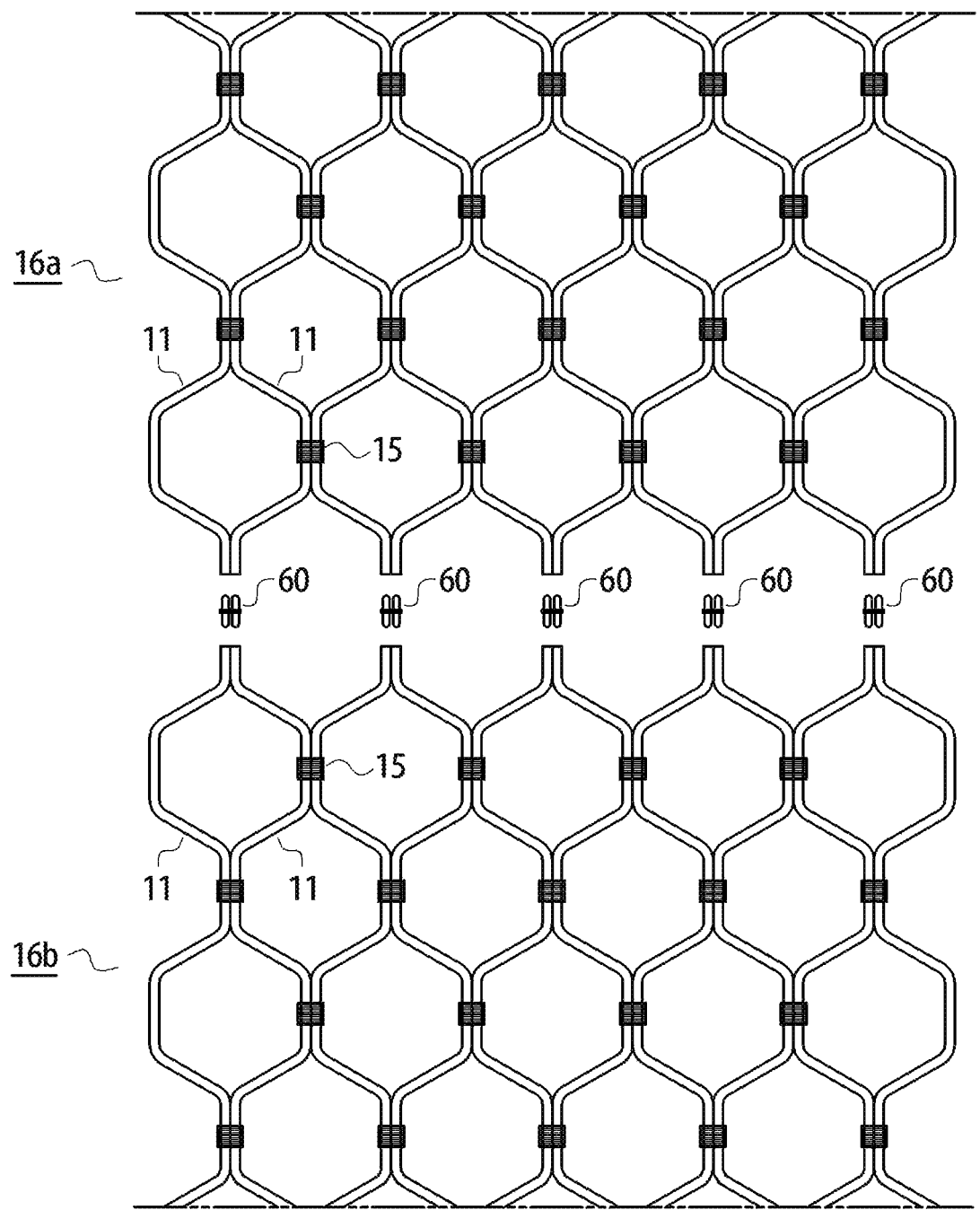
FIG. 13 is an explanatory diagram of a case where the frame structures is connected by a tubular joint.

Therefore, when the ends of the two frame structures in FIG. 2 are opposed, as shown in FIG. 13, it is possible to face the end faces of all of the tube 11 of the frame structure 16 a, 16 b. Thus, the opposing end faces will be connected by the tubular joint 60 in this embodiment.

Figure 14A:
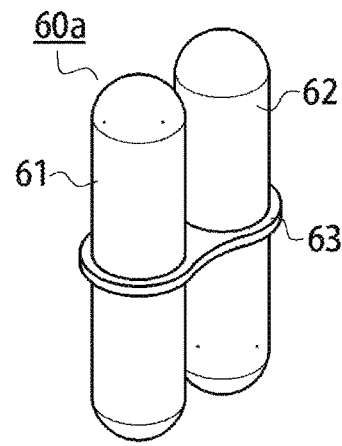
FIG. 14A is an external perspective view showing a first type of tubular joint.
Figure 14B:
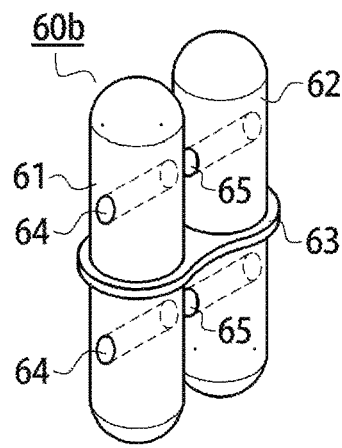
FIG. 14B is an external perspective view showing a second type of tubular joint.
Figure 14C:
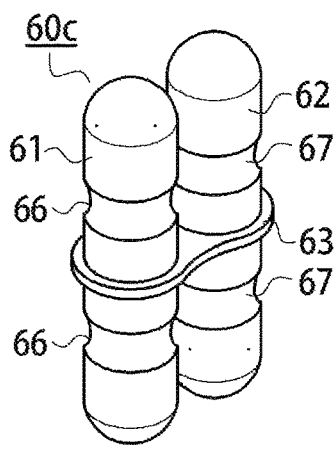
FIG. 14C is an external perspective view showing a third type of tubular joint.

Examples of the tubular joint 60 are shown in FIGS. 14 (A), 14 (B) and 14 (C).

The three kinds of tube fittings 60a, 60b, and 60c in FIG. 14 are composed of two short round bars 61, 62 and a thin plate-like flange 63. The two short round bars 61, 62 have a diameter that fits inside the tube 11. The thin plate-shaped flange 63 fixes the two round bars 61, 62 at intermediate positions in the longitudinal direction thereof. The flange 63 in the form of a thin plate is fixed in a parallel state with a gap slightly larger than twice the tube wall thickness of the tube 11. When viewing the flange 63 as a plan view, the outer edge shape is such that the center portion of the ellipse enveloping the end faces of the two tubes 11 has a slight constricted shape.

In any of the tube fittings 60a, 60b, 60c, the portions of the round bars 61, 62 on the upper and lower sides of the flange 63 are guided from the end faces of the pair of tubes 11 of the two frame structural bodies 16a, 16b of connection. In a state where the end faces of the tube 11 sandwich the flange 63, the frame structures 16a and 16b are connected.

Tube joint 60a in (A) are simple round bars 61, 62 merely having both ends formed into a hemispherical plane. In the tube joint 60 b of FIG. 6 (B), holes 64, 65 are formed in the intermediate positions of the upper and lower portions of the flanges 63 of the respective round bars 61, 62 in the arrangement direction of the round bars 61, 62, respectively. In the tube joint 60 c of FIG. 7 (C), U-shaped grooves 66, 67 are formed on the entire periphery of intermediate positions of the respective portions of the round bars 61, 62 above and below the flange 63.

Incidentally, as can be inferred from FIG. 13, It is desirable to make the connecting portion and the other binding portion indistinguishable from the appearance, by applying the binder 15 to the connecting portion even in a state in which the frame structures 16a, 16b are connected by the tube joint 60.

The binder 15 of FIG. 3 simply has a binding function for two tubes. For example, the tube may be made of aluminum and the strip 15a does not need to have an inward constriction as seen in FIG. 3. In this case, a large number of cone-shaped small protrusions for holding the outer peripheral plane of the pipe material 11 are provided on the inner plane of the band plate 15a. In this way, by providing the binder 15 with a binding function together with a retaining function together with the binding tool 15, it is sufficient to merely position the end faces of the tubes and bring them into abutment state via the flange 63. That is, the tube joint 60a suffices as shown in FIG. 14 (A).

Figure 15:
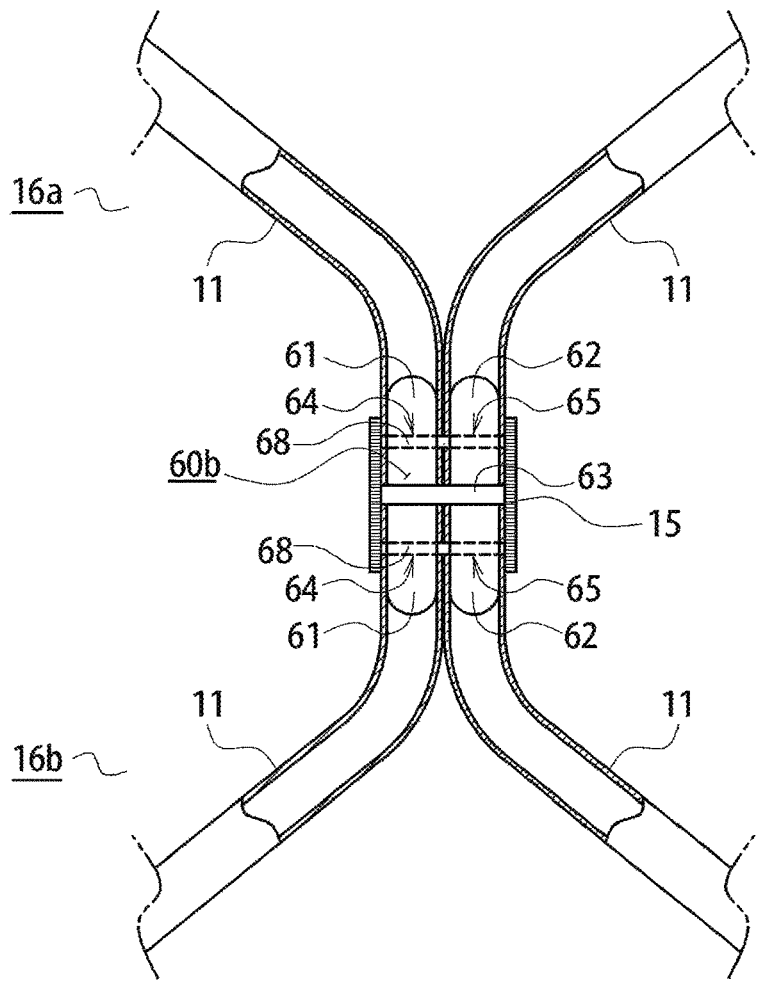
FIG. 15 is a cross-sectional view of a main part in the case where the end portion of the tube of the frame structure body is connected by the tubular joint of FIG. 14B.

On the other hand, when such a binder is not used, the tube joint 60 b of FIG. 14 (B) or the tube joint 60c of (C) is used. FIG. 15 is a cross-sectional view of a main part showing the connected state when the tube joint 60 b is applied.

The portions of the round bars 61 and 62 on the upper and lower sides of the flange 63 are respectively fitted into the two adjacent tubes 11 at the end portions of the frame structures 16a and 16b. The pair of tubes 11 opposed to each other in the vertical direction are positioned by the round bars 61 and 62 and brought into abutment via the flange 63. Here, in the tube 11, holes are drilled at positions corresponding to the holes 64, 65 of the respective round bars 61, 62 in their abutting state in advance.

Therefore, two disengagement prevention pins 68 corresponding to approximately twice the diameter of the tube 11 are inserted into the upper and lower through holes formed by the holes of the tube 11 and the holes 64, 65 of the round bars 61, 62. In this state, if the binder 15 is attached, the slip-off preventing pin 68 is prevented from coming out. A simple and reasonable tube joint mechanism can be realized.

The tube joint 60c of FIG. 14 (C) is used when the structure constituted by connecting the frame structures 16 is such that it is semi-permanently installed.

As in the case of the tube fittings 60a and 60b, the upper and lower portions of the flanges 63 of the round bars 61 and 62 are respectively inserted into the two tubes 11 adjacent to each other at the end portions of the frame structures 16a and 16b. The pair of tubes 11 facing each other in the vertical direction are positioned and abutted with each other. In this tube joint 60c, in this state, portions corresponding to the grooves 66, 67 of the round bars 61, 62 in the respective tubes 11 are closed from the outside, thereby preventing coming off.

Figure 16:
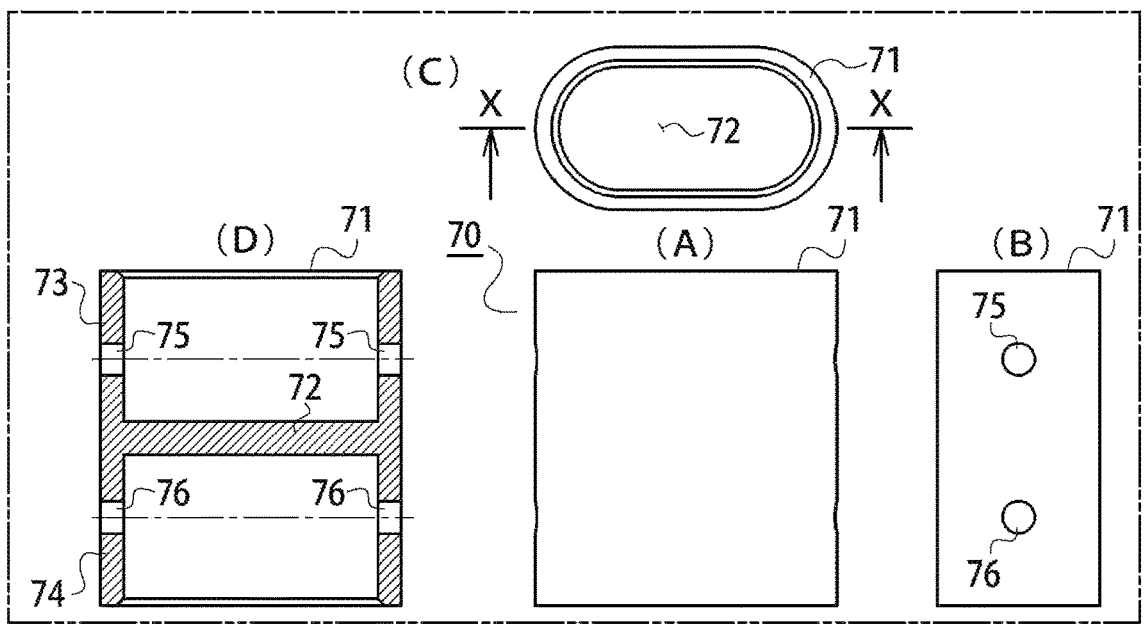
FIG. 16 is a front view (A), a side view (B), a plan view (C) and X-X cross-sectional view taken (D) of the bar joint when the frame structure is composed of a bar.

On the other hand, when the frame structure body 16 is made of a bar instead of a tube, a bar joint 70 as shown in FIG. 16 can be used.

A partition plate 72 is provided at an intermediate position in the axial direction of the oval cylindrical body 71. Holes 75, 76 are formed in both end portions of the upper and lower wall portions 73, 74 of the partition plate 72 in the longitudinal direction of the ellipse. This bar coupling 70 is formed in this way.

Here, the oblong tubular body 71 is a shape that envelops the outer periphery of adjacent two parallel bars.

Figure 17:
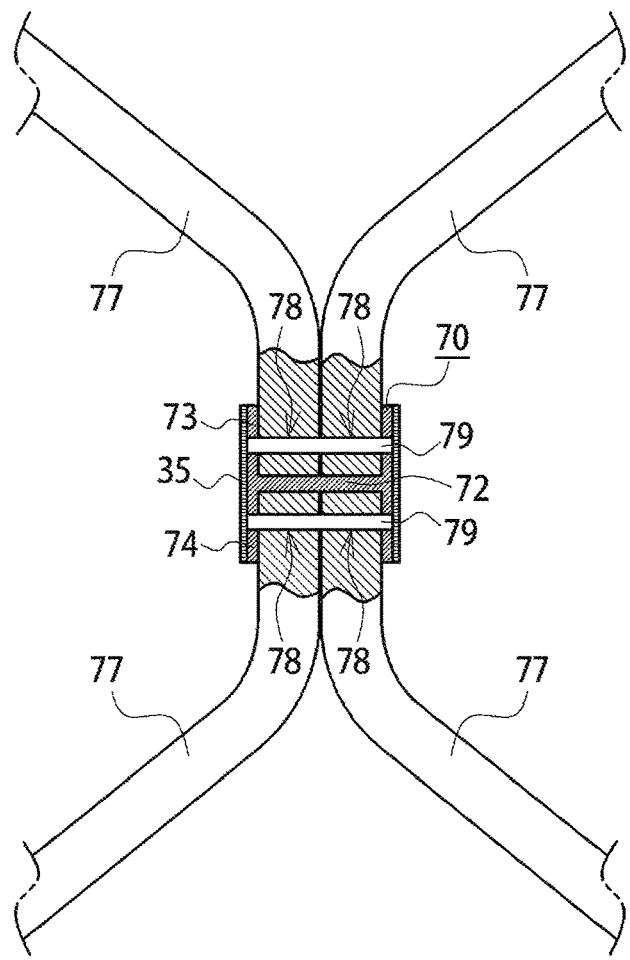
FIG. 17 is a cross-sectional view of a main part in a case where the end portions of the bars of the frame structure body are connected by the bar joint shown in FIG. 16.

Therefore, the case will be set forth where a bar is used instead of the tube 11 in the frame structures 16a and 16b of FIG. 13. As shown in FIG. 17, it is preferable that each end of the upper and lower frame structures having two adjacent bars 77 is connected by the bar joint 70. First, suppose the abutting state using a partitioning plate 72 to cause the respective ends internally fitted to the respective walls 73, 74 of the upper and lower partition plate 72 of the bar joint 70.

A hole 78 is formed in the end portion of each bar 77 at positions corresponding to the holes 75, 76 of the bar coupling 70 in a state of being fitted in the bar coupling 70 in advance. A retaining pin 79 having a length corresponding to the longitudinal direction of the ellipse of the bar coupling 70 is inserted through the holes 75, 76 of the bar coupling 70 and the hole 78 of each bar 77. Further, the binding band 35 is attached to prevent the retaining pin 79 from coming out.

By using the tube fittings 60 a, 60 b, 60 c and the bar coupling 70 as described above, the frame structures 16, 26, 34, 45, 55, 56 can be connected. It is possible to construct curtain building windows such as garage and agricultural vinyl house with some degree of freedom.

Figure 18:
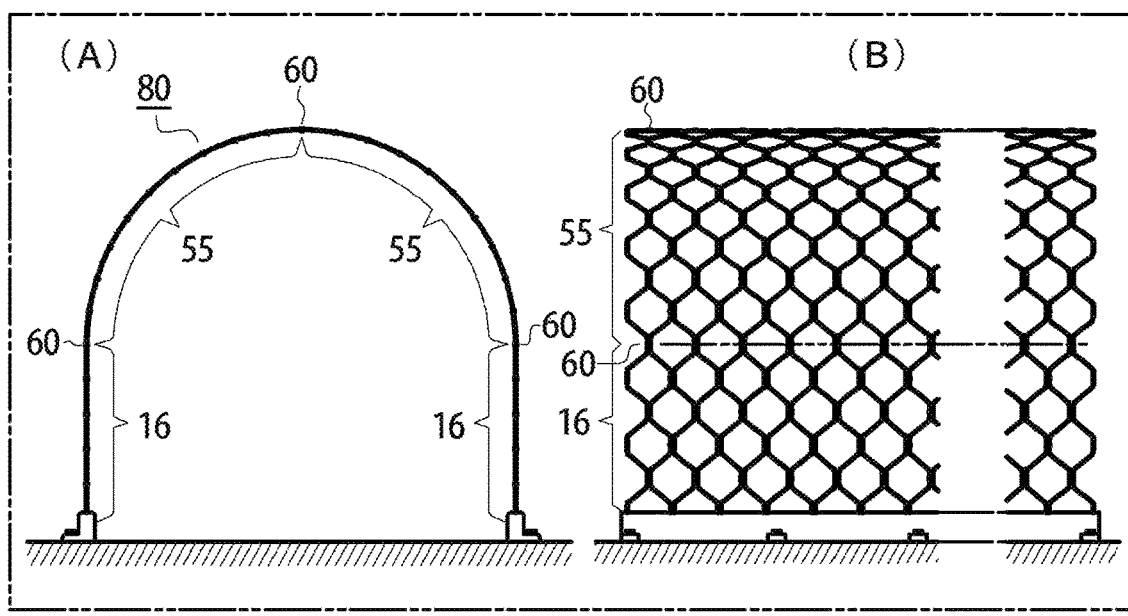
FIG. 18 is a front view (A) and a side view (B) of Sheet tensioning building body (for agricultural plastic sheeting or greenhouse) constituted by connecting the frame structure.
Figure 19:
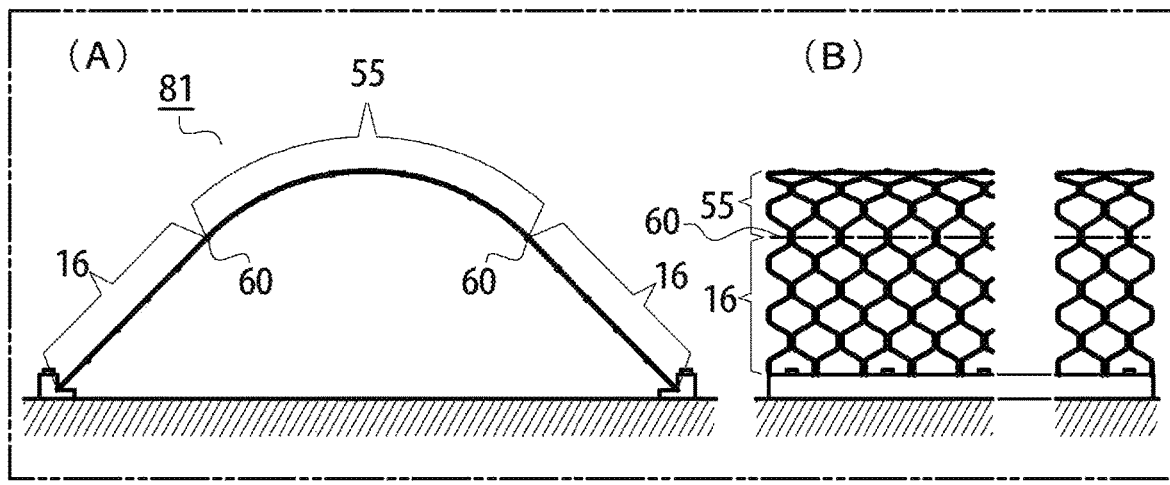
FIG. 19 is a front view (A) and a side view (B) of another curtain attachment building (garage) configured by connecting a plurality of types of frame structures.

For example, FIG. 18 is a curtain tensioning precursor 80 according to the agricultural greenhouses and greenhouses. FIG. 19 is a curtain tensioning precursor 81 according to the garage. The curtain tensioning precursor 80 and the curtain tensioning precursor 81 can be constructed by connecting the tube joint 60 (60a, 60b, 60c), the frame structure 16 and frame structure 55, respectively.

Figure 20:
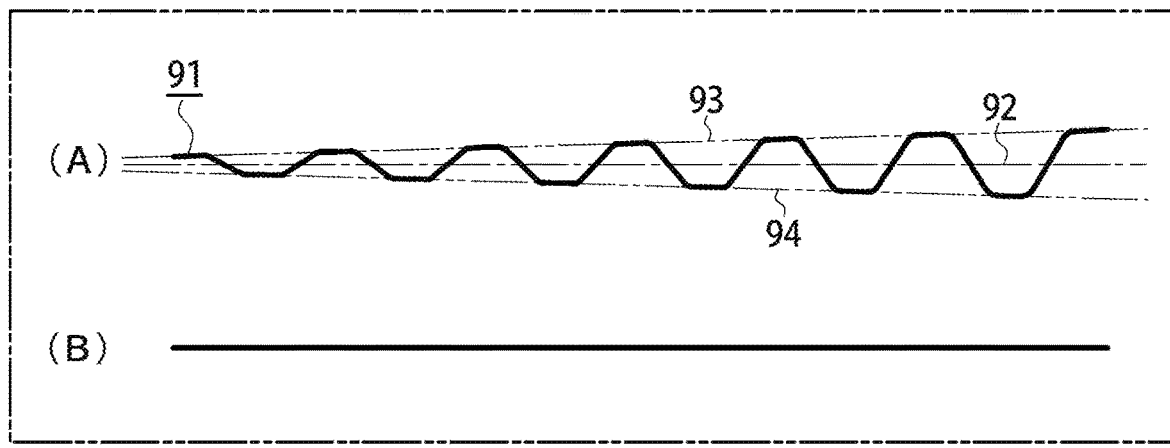
FIG. 20 is a front view (A) and side view (B) of the tube after bending used in a form of frame structure.

A tube 91 used for this frame structure is shown in a front view (A) and a side view (B) in FIG. 20. Like the tube 11, the trapezoidal waveform is bent, but the amplitude is proportionally smaller from one end to the other end.

The tube 91 is bent into a trapezoidal waveform in a meandering manner on both sides of the linear shaft 92 as a center. On the other hand, the maximum amplitude section is configured along two lines 93 and 94 in a symmetrical relationship with respect to and non-parallel with the same linear axis 92. The bending shape is such that the amplitude is proportionally attenuated.

Figure 21:
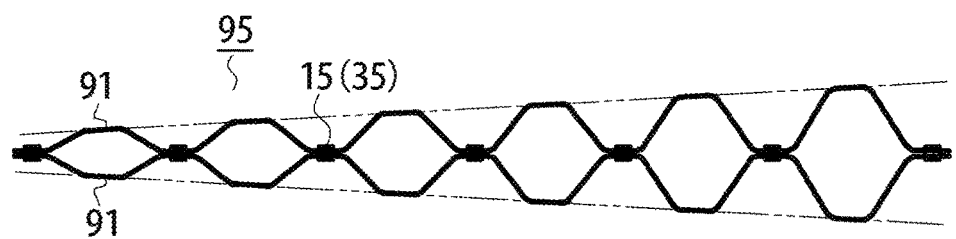
FIG. 21 is a front view showing the two binding state of tubes of FIG. 20.
Figure 22:
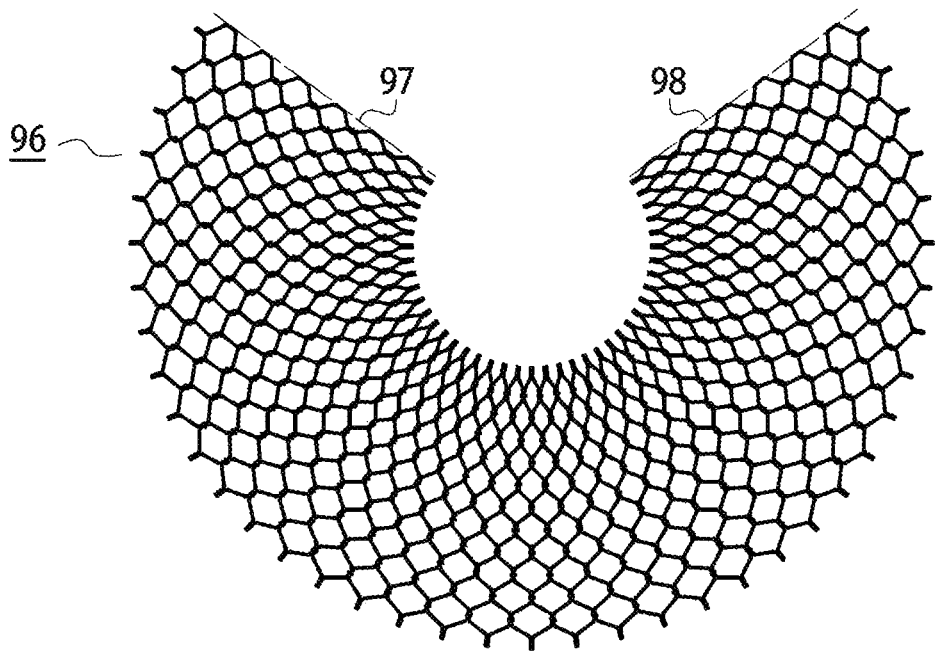
FIG. 22 is a plan developed view of an embodiment of a frame structure.

The two tubes 91 are in opposite relation to each other so that the maximum amplitude section is brought into abutting contact with each other. When united by the binder 15 and the binding band 35, it becomes the unit 95 of the frame structure as shown in FIG. 21. Further, when the units are bundled laterally in the maximum amplitude section, a frame structure 96 as shown in FIG. 22 is obtained.

Figure 23:
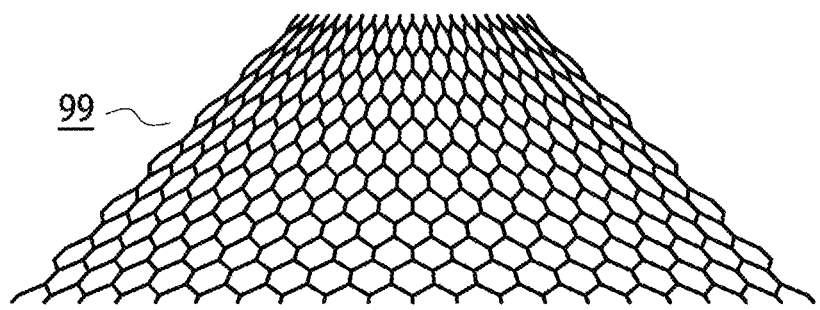
FIG. 23 is a front view of Sheet tensioning building body (frustoconical tents) of a frame structure.

Then, the lateral end portions 97, 98 of the frame structure 96 that is developed in a plane are bound with the binder 15 and the binding band 35 in the maximum amplitude sections. As a result, the tubes 91 can rotate with respect to each other at all the binding portions. Therefore, it is possible to assemble a truncated cone-shaped screen curtain installation frame 99 as shown in FIG. 23.

According to this curtain covering frame 99, since the roof is provided on the ceiling portion, a frustum-shaped indoor space can be formed. High strength can be obtained because the wall plane is a frame structure in which hexagons are aligned vertically and horizontally without gaps.

While a tube subjected to bending processing of a trapezoidal waveform is used in this embodiment as the tube 91, a bending process with another waveform such as a sinusoidal wave may be performed.

Figure 24:
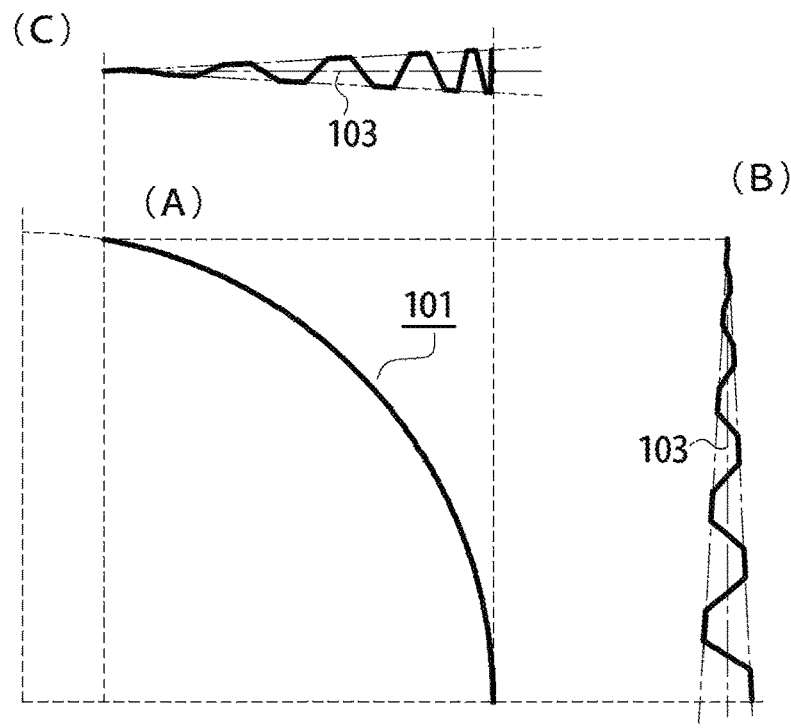
FIG. 24 indicates a front view (A) and side view (B) and plan view (C) of one of the tube after bending constitutes one form of the frame structure processing.
Figure 25:
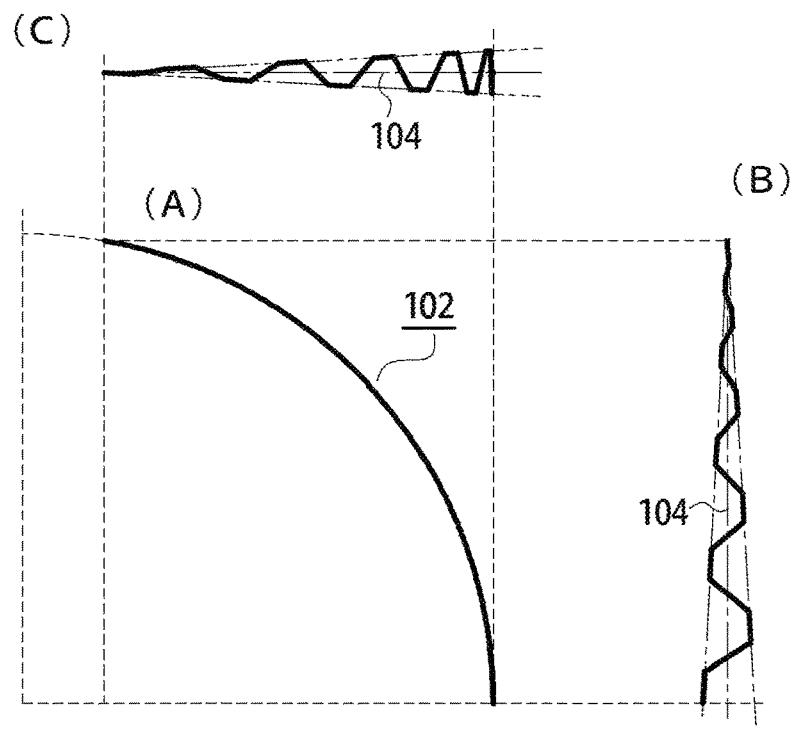
FIG. 25 indicates a front view (A) and side view (B) and plan view (C) of the other tube after bending constitutes a form of frame structure.

There are two types of tubes used for the frame structure of this embodiment. One of the tubes 101 is shown in a front view (A), a side view (B), and a plan view (C) in FIG. 24. The other tube 102 is shown in FIG. 25: a front view (A), a side view (B), and a plan view (C).

That is, as shown in the front view, both tubes 101 and 102 are bent in an arc shape in the entire section in the longitudinal direction. On the other hand, as shown in the side view and the plan view, the bending process is performed so as to form a trapezoidal waveform which appears such that the amplitude proportionally decreases from one end to the other end. The tube 101 and the tube 102 are different in that the trapezoidal waveform has a symmetrical relationship with respect to the central axes 103, 104 thereof.

Figure 26:
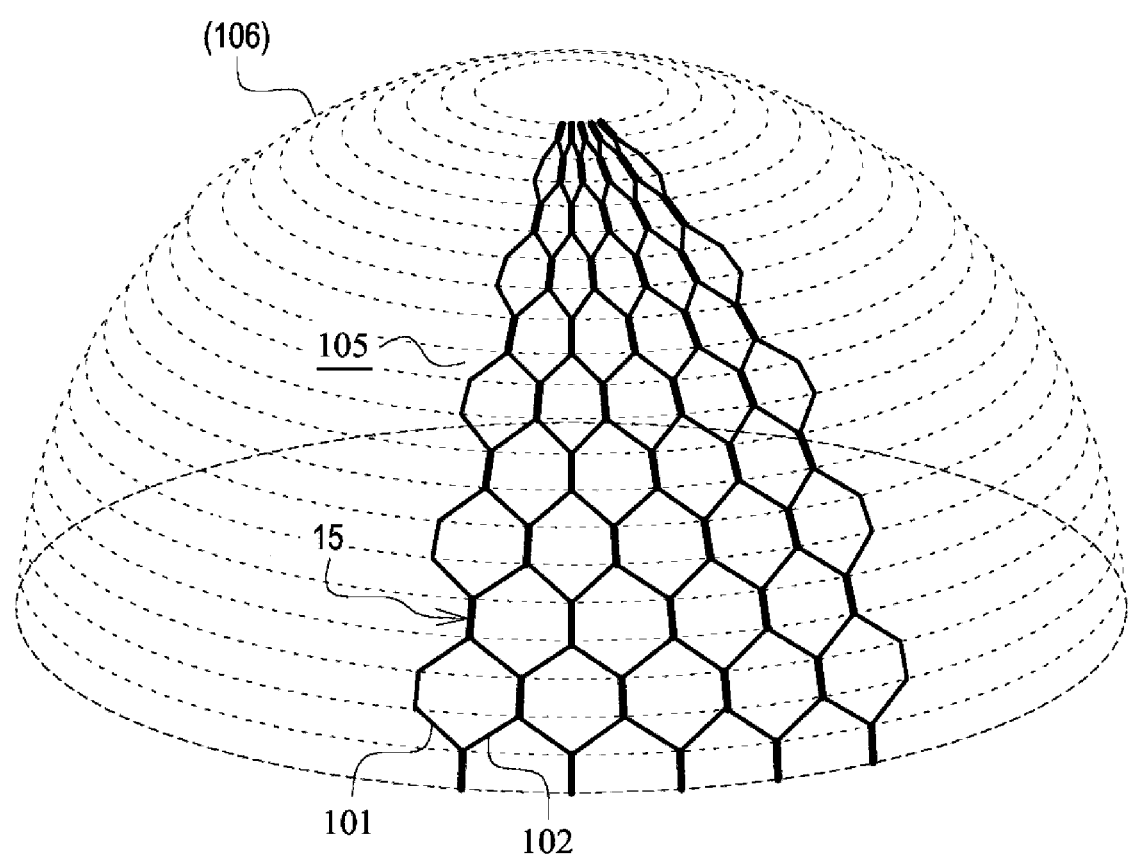
FIG. 26 is an external perspective view of an embodiment of a frame structure, showing an assumed shape of the curtain tensioning building body (domed tents) configured by the frame structure.

As described above, the tubes 101 and 102 subjected to the two kinds of bending processes are alternately brought into contact at the maximum amplitude sections of the trapezoidal waveform, and then bundled together by the binder 15 or the binding band 35. The frame structure 105 constituting a part of the spherical wall plane as shown in FIG. 26 can be constituted.

Further, this frame structure body 105 is connected and expanded laterally by the binder 15 or the binding band 35. As shown by a broken line in FIG. 26, it is possible to construct a dome-shaped curtain body stretching frame 106.

The bending process applied to the tubes 101 and 102 is not limited to bending into a trapezoidal waveform but may be other waveforms such as a sinusoidal wave as in FIGS. 20-23.

According to the frame structure of the present embodiment, it is possible to construct a frame plane in which tubes or bars bent into symmetrical planar waveforms are laterally connected at each maximum amplitude portion.

Regarding the planar waveform, it suffices if it has a meandering waveform around the linear axis. The amplitude is required to be constant, while it does not matter whether there is periodicity or not.

With respect to the method of bending the tube, it is preferable to use the pushing bending apparatus in that the bending processing is performed without flattening the cross section of the tube as much as possible. As a bending method for the bar, it is desirable to use roll bending, press bending, or a combination thereof as conventionally used.

As a means for bundling, it is possible to use a binding tool of a type in which two tubes or bars are held and fixed by a latching mechanism, or a resin or metal binding band widely used in the past. As long as it is a simple frame structure to be used temporarily, means for bundling may be a resin or metal adhesive tape.

Since the binding portion can be relatively rotated except in a case where the binding portion is bound with the adhesive tape, the frame plane is not limited to a flat plane but also a cylindrical plane or meandering plane.

An aspect of a frame structure is constructed as follows: Bending into a first plane waveform having a constant amplitude around a linear axis. Bending into a second plane waveform having a constant amplitude with a constant period around the linear axis in a direction perpendicular to the bending direction of the first plane waveform. In this way, a first tube or bar is formed.

Next, a large number of second tubes or bars are used, each of which is different from the first tube or bar in having a first planar waveform that is symmetrical with respect to the straight line with respect to the first planar waveform.

The maximum amplitude portion of the first planar waveform in the first tube or bar and the maximum amplitude portion of the target planar waveform in the second tube or bar are brought into opposing contact and are bundled, so as to construct a plane formed by a frame structure.

According to this frame structure, a planar frame of the frame structures can further form a surface that is wavy with a constant amplitude and a constant period also in a direction perpendicular to the same plane along the linear axis.

Another aspect of the frame structure is as follows. First, bending is performed to form a first plane waveform having constant amplitude around a linear axis. Then, in all sections or partial sections, arc bending is performed in a direction perpendicular to the bending direction of the first plane waveform. In this way a third tube or bar is formed. Next, a large number of fourth tubes or bars identical to the third tube or bar are used, except that the first planar waveform has a waveform that is symmetrical with respect to the linear axis with respect to the linear axis. Then, the maximum amplitude portion of the first planar waveform in the third tube or bar and the maximum amplitude portion of the target planar waveform in the fourth tube or bar are brought into abutting contact with each other and bundled. This constitutes a frame structure constituting the plane by the frame.

According to this frame structure, the frame plane is an arcuate plane which is equivalent to a part or a whole of the arch-like plane in the longitudinal direction of the tube or bar whereas the frame plane is formed in a flat shape in the first frame structure.

Another aspect of the frame structure is as follows. The third tubes or bars and the fourth tubes or bars in the above frame structure are superimposed through an arcuate bending process, being bent to a third plane waveform of constant amplitude and constant period around the arcuate bending surface. In this way, the frame structure is formed.

According to this frame structure, the arcuate frame plane forms a wavy plane further along the linear axis in a direction perpendicular to the same plane at a constant amplitude and a constant period.

According to another aspect of the frame structure, a plane wave at various frame structures described above is a trapezoid formed by a maximum amplitude section parallel to a linear axis and an inclined section having an angle of intersection of +/−60 degrees with respect to linear axis which continuously alternate at the same length.

According to this frame structure, each frame structure constitutes a honeycomb structured plane in which regular hexagons made up of tubes or bars are vertically and horizontally arranged without gaps. A wall plane with a large buckling strength is formed because external forces acting in the same direction are dispersed.

In each of the above frame structures, the planar waveform may be a sinusoidal waveform. According to this framework structure, smooth adjacent corrugations by tubes or bars can form a framework plane, so that a unique high esthetic property can be developed.

In each of the above frame structures, both end faces of respective tubes or bars are aligned in two planes perpendicular to the linear axis, and the positions of the end faces of the respective tubes or bars on the two planes are made identical.

Thus, the frame plane is formed into a predetermined unit size surface, and the end faces of respective tubes or bars on the unit size surface are connected by a predetermined joint mechanism, allowing expansion to a larger frame surface.

It is should be noted that if the positions of the end faces of the respective tubes or bars are not only the same but also aligned, the connecting operation by the joint mechanism becomes more efficient.

On the other hand, as for the extension of the unit size surface to the side, it suffices to bundle the maximum amplitude portions of the tube or bar at both side ends of the frame surface.

Another aspect of the frame structure is as follows. A large number of tubes or bars are bent to the same plane waveform whose amplitude is proportionally smaller from one end to the other around the linear axis. Then, the maximum amplitude portions at the same position in the respective longitudinal directions are brought into opposing contact with each other and bundled, thereby constituting a frame structure constituting the surface by the frame. According to this frame structure, a frame surface corresponding to a part or all of the side surface of the truncated cone can be formed.

Another aspect of the frame structure is as follows. Fifth tube or bars are bent into the shape, so that its front view appears an arc, and a plane view and a side view appear as proportionally smaller waveform amplitude around the linear axis from one end to the other end.

Then, a large number of sixth tubes or bars are different from the fifth tubes or bars only in that the waveforms of the plan view and the side view which are symmetrical with respect to the waveform and the straight line.

The portion corresponding to the maximum amplitude of the waveform of the fifth tube or bar and the portion corresponding to the maximum amplitude of the waveform appearing in the object in the sixth tube or bar are brought into contact with each other in an opposed manner. Thereby providing a frame structure that constitutes a surface by a frame. According to this frame structure, a frame surface corresponding to a part or the whole of the dome-shaped surface can be formed.

As a result of the embodiment set forth as above, various advantages are expected.

According to the frame structure, various types of wall surfaces can be formed by bundling tubes or bars which are subjected to bending under various conditions. The examples of the various wall surfaces are: flat walls by the frame (deformable to a cylindrical surface or meandering surface); the arcuate wall; the wall surface corresponding to a part or the whole of the truncated cone side; and a wall surface corresponding to a portion of the dome-shaped wall.

Also, according to an embodiment of the frame structure, it is possible to configure wall surface by frame to wave within a constant amplitude and fixed cycle. By comprising a certain elasticity against an external force acting in the longitudinal direction of the tube or bar in the walls, it is possible to absorb and alleviate the growing brittleness. In particular, it absorbs and relaxes the increase in brittleness due to work hardening of tubular and bars by bending. Furthermore, it is possible to develop a characteristic aesthetic property due to waving.

Also, according to an embodiment of the frame structure, when the bending condition is a trapezoidal wave or a sine wave, the frame structure of the wall surface is formed in the honeycomb structure. Thus, a frame structure with an improved buckling strength can be constituted. Alternatively, it is possible to constitute a frame structure in which roughly spindle shaped windows are aligned, allowing a high aesthetic property to be felt.

According to one form of the frame structure body, since the wall surface by the frame is made to be a unit wall surface of a predetermined size under certain conditions, it can be connected and expanded with a simple joint mechanism. It also facilitates the construction of skeletal structures of various sizes and forms.

According to one form of frame structure, a truncated conical or dome shaped interior space can be constructed with a special skeletal wall surface. Therefore, a structure that is stronger than that obtained by the conventional frame structure is obtained, and the impression seen from inside the room becomes an orderly repeat pattern. Therefore, a pleasant atmosphere can be brought out.

The wall surface utilizing the frame structure of the present embodiment does not have a truss structure therein. Even if the wall surface is constituted by narrow tubes or a bars, the wall surface is a much stronger structure compared to a conventional small scale building for curtain cladding based on a rigid frame structure (such as garage and agricultural vinyl house), so that it is strong, resistant against wind and snow, and also excellent in earthquake resistance.

In addition, since the frame constructed by utilizing the frame structure of this embodiment has a meandering shape of the tube or bar on the entire wall surface thereof. When curtains or thin plates are attached, their exterior surfaces can be evenly supported from the inside and a large number of fixing portions can be equally provided, so that the deflection of the curtain body or the thin plate can be made inconspicuous.

The frame structure of the present embodiment can be used for a simple curtain attachment frame such as a garage, an agricultural vinyl house or a temporary tent.

While this present disclosure has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A frame structure forming a surface, the frame structure comprising:
a plurality of elongated members, wherein,
each of the elongated members have a waveform shape of a constant amplitude about a linear axis,
each of the elongated members are bundled with another of the elongated members at a maximum and minimum of the waveforms of the bundled elongated members,
a plurality of the bundled maximum and minimums are on a line perpendicular with each linear axis, and
the plurality of elongated members include,
first elongated members bent along a first plane wave about a first linear axis and bent along a second plane wave about a second linear axis perpendicular to a bending direction of the first plane wave, and
second elongated members bent along a second plane wave symmetrical to the first plane wave with regard to the first linear axis and bent along a third plane wave about a third linear axis perpendicular to a bending direction of the first plane wave, wherein one the first elongated members is faced, contacted, and coupled with one of the second elongated members at a maximum and minimum of the waveforms of the first and second elongated members.

2. The frame structure of claim 1, wherein the plurality of elongated members further include,
    third elongated members bent along the first plane wave about a third linear axis and bent to form an arc perpendicular to a bending orientation of the first plane wave for at least a portion of the third elongated members, and
    fourth elongated members bent along a fourth plane wave symmetrical to the first plane wave with regard to the first linear axis and bent to form an arc perpendicular to the bending orientation of the first plane wave for a at least a portion of the fourth elongated members, wherein one the third elongated members is faced, contacted and coupled with one of the fourth elongated members at a maximum and minimum of the waveforms of the third and fourth elongated members.

3. The frame structure of claim 2, wherein the third and the fourth elongated members are bent along a third plane wave periodical with an arc central plane, to overlap an arc bending processing.

4. The frame structure of claim 3, wherein all of the plane waves form a trapezoidal waveform having an inclined section with a crossing angle of +/−60 degrees with respect to a corresponding linear axis to continuously alternate in a same length.

5. The frame structure of claim 1, wherein the first plane wave is a sinusoidal waveform.

6. The frame structure of claim 1, wherein end planes of the elongated members are aligned along two planes both perpendicular to the first linear axis, and wherein the end planes coincide on the two planes.

* * * * *